(No Model.)
E. T. COVELL.
CHECKREIN ATTACHMENT.
No. 370,320. Patented Sept. 20, 1887.
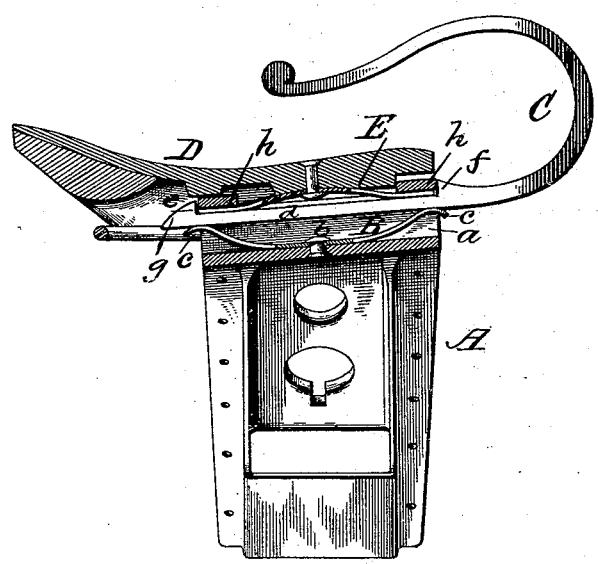
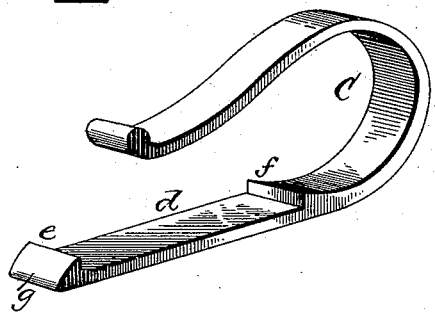
Witnesses
Inventor
Edward T. Covell,
By his Attorney

UNITED STATES PATENT OFFICE.

EDWARD T. COVELL, OF NEW BEDFORD, MASSACHUSETTS, ASSIGNOR OF ONE-HALF TO CHARLES F. CUSHING, OF SAME PLACE.

CHECKREIN ATTACHMENT.

SPECIFICATION forming part of Letters Patent No. 370,320, dated September 20, 1887.

Application filed January 18, 1887. Serial No. 224,707. (No model.)

*To all whom it may concern:*

Be it known that I, EDWARD T. COVELL, a citizen of the United States, residing at New Bedford, in the county of Bristol and State of Massachusetts, have invented certain new and useful Improvements in Checkrein-Hooks for Harness-Saddle Trees; and I do hereby declare that the following is a full, clear, and exact description of the same, reference being had to the annexed drawings, making a part of this specification, and to the letters and figures of reference marked thereon.

Figure 1 of the drawings is a sectional elevation of a harness-saddle tree and seat connected thereto, also the checkrein-hook in elevation, showing it connected to the tree; and Fig. 2, a detail view, in perspective, of the checkrein-holder.

The object of the present invention is to provide a harness-saddle tree with a checkrein-hook that will yield or give should the horse stumble, thereby preventing the danger of injury to the animal or to the checkrein, which is too frequently the case where the hook is rigidly secured to the saddle-tree or seat thereof, which objects I attain by the construction substantially as shown in the drawings, and hereinafter described and claimed.

In the accompanying drawings, A represents the harness-saddle tree of the usual construction, except that it is formed with a channel, $a$, upon its upper side, within which is located a suitable spring, B. In the present instance I have shown the spring as formed from a strip of spring metal riveted or otherwise secured at or near its center, as shown at $b$, the spring being of the kind known as a "bow-spring," and having its ends curved, as shown at $c$, said ends bearing against the under side of the shank $d$ of the checkrein-hook C, the same being of any of the usual forms. The shank $d$ of the hook C is provided with shoulders $e\ f$, and the extremity of the shank upon the outer side of the shoulder $e$ being beveled, as shown at $g$, so that it will form a wedge to depress the end of the spring B when connecting the hook to the saddle-tree.

When the hook C is in position, as shown in Fig. 1, it is securely held in place by the pressure of the spring B, which bears against the under side of the hook, and by means of the shoulders $e\ f$ and the stops $h$, extending transversely over the channel $a$, the hook is prevented from moving longitudinally in either direction.

If preferred, the spring may be secured to the checkrein-hook instead of to the saddle-tree, the same result being attained in either construction.

As will be seen, there are no screws, rivets, or other like fastenings employed, and consequently the hook is readily and quickly removed by depressing the end of the shank $d$ until the shoulder $e$ thereon is below and passes under the rear one of the stops $h$, when the hook with its shank can be withdrawn.

There being no bolts or nuts employed, all danger of injury to the horse's back is entirely avoided, thereby making it more comfortable to the animal.

By the employment of the spring, the hook has a downwardly-yielding motion when any forward pressure or strain is brought thereon by the checkreins, thus preventing injury to the animal should it stumble, and also any injury to the rein, this being an essential feature of the invention.

The seat D, which is also detachably connected to the saddle-tree by means of the catch E, will form the subject of a separate patent, as will also the construction of the saddle-tree to adapt it to receive the saddle and checkrein-hook.

Having now fully described my invention, what I claim as new, and desire to secure by Letters Patent, is—

The combination, with a harness-saddle tree, of a checkrein-hook provided with a shank beveled at its extremity, and having shoulders at both its rear and forward ends, and a spring for holding the hook or shank thereof in position, substantially as and for the purpose set forth.

In testimony that I claim the above I have hereunto subscribed my name in the presence of two witnesses.

EDWARD T. COVELL.

Witnesses:
A. EDWIN CLARKE,
DANL. S. DEVOLL.